(12) United States Patent
Yamamura et al.

(10) Patent No.: US 6,251,519 B1
(45) Date of Patent: Jun. 26, 2001

(54) FRICTION MEMBER

(75) Inventors: Shozo Yamamura, Itami; Hisao Sanai; Takashi Hata, both of Hirakata, all of (JP)

(73) Assignee: Exedy Corporation, Osaka (JP)

( * ) Notice: Subject to any disclaimer, the term of this patent is extended or adjusted under 35 U.S.C. 154(b) by 0 days.

(21) Appl. No.: 09/662,726

(22) Filed: Sep. 15, 2000

(30) Foreign Application Priority Data

Sep. 27, 1999 (JP) .................................................. 11-272136
Oct. 25, 1999 (JP) .................................................. 11-302531

(51) Int. Cl.$^7$ .............................. D01F 6/00; F16D 69/02; C09K 3/14
(52) U.S. Cl. .......................... 428/369; 428/221; 428/375; 188/251 A; 188/73.37
(58) Field of Search ..................................... 428/375, 369, 428/221; 188/73.37, 251 A; 192/12 R

(56) References Cited

FOREIGN PATENT DOCUMENTS

| 355086933A | * | 7/1980 | (JP) | .................................. 188/251 A |
| 401234629A | * | 9/1989 | (JP) . | |
| 402209635A | * | 8/1990 | (JP) | .................................. 188/251 A |
| 41102270A | * | 1/1999 | (JP) . | |

* cited by examiner

*Primary Examiner*—N. Edwards
(74) *Attorney, Agent, or Firm*—Shinjyu Global IP Counselors, LLP

(57) ABSTRACT

A friction member is provided which can suppress judder without impairing wear resistance. The friction member is prepared by impregnating or coating base fibers with a composition containing rubber and/or resin to prepare the yarn for the friction member, preshaping the yarn into an annular form, and then thermally molding the preshaped yarn. The friction member has porosity in a range from about 10% to about 20%.

33 Claims, 1 Drawing Sheet

FRICTION MEMBER

BACKGROUND OF THE INVENTION

1. Field of the Invention

This invention generally relates to a friction member. More specifically, the present invention relates to a friction member used in a clutch device of an automobile or the like.

2. Background Information

A dry clutch device of an automobile is provided with a friction facing, which is pressed against a flywheel for frictionally transmitting power.

The friction facing for a dry clutch device is produced in the following manner. First, glass yarn made of, e.g., only glass fibers or a mixture of glass fibers and metal lines twisted together is prepared. Then, the glass yarn is moved into an impregnation tank containing a composition of rubber, curing agent, thermosetting resin and other materials dissolved in a solvent. Thus, the glass yarn is impregnated and coated with the above composition. The yarn for the friction member thus prepared is wound and preshaped into an annular form (i.e., a product form). Thereafter, the final product of the friction facing is completed through thermal pressing, curing, polishing and other steps.

In the manufacturing method of the friction facing described above, the glass yarn is immersed in the impregnation tank. The glass yarn is impregnated and coated with the composition. Therefore, the resin composition moves into the glass yarn.

It has been known that when starting a vehicle, automobile clutch judder is affected by the amount of spaces which are present within the facing. To suppress the judder, it is necessary to increase the porosity by increasing a ratio of spaces within the molded portion. However, it is difficult to increase the porosity of the yarn in conventional methods of facing manufacture because the resin is present within the glass yarn.

In the prior art, therefore, the porosity of the molded portion is controlled by controlling the pressure during the thermal molding. However, although the judder can be suppressed, an increase in porosity of the molded portion lowers the resistance against wearing, and thus shortens the life of the facing.

In view of the above, there exists a need for a friction member which overcomes the above mentioned problems in the prior art. This invention addresses this need in the prior art as well as other needs, which will become apparent to those skilled in the art from this disclosure.

SUMMARY OF THE INVENTION

An object of the invention is to suppress judder without impairing wear resistance.

According to an aspect of the present invention, a friction member is prepared by impregnating or coating base fibers with a composition containing rubber and/or resin to prepare yarn for the friction member, preshaping the yarn into an annular form, and then thermally molding the preshaped yarn. The friction member preferably has porosity in a range from about 10% to 20%. A porosity of or larger than about 10% can provide a sufficient amount of spaces in a molded portion. Thus, the friction member which is used as a friction facing for an automobile clutch device can suppress judder. Since the porosity does not exceed about 20%, impairment of wear resistance can be prevented. The porosity is a rate of spaces within the facing, and is expressed as a percentage of a volume of absorbed oil with respect to a volume of a specimen, as will be described in greater detail.

According to another aspect of the present invention, the friction member of the aforementioned aspect of the present invention further has a feature such that an apparent density is about 1.75 or less. This can reduce weight when compared to the density of conventional friction members. The apparent density is calculated from the weight and the volume.

According to another aspect of the present invention, the friction member of either of the previous aspects of the present invention further has a feature such that the yarn for the friction member is formed of strands of base fibers with a twist of about 10–90 T/M. If the twist were smaller than about 10 T/M, twisting could not provide adequate porosity. If it were larger than about 90 T/M, twist-back would occur, resulting in problems while manufacturing.

According to another aspect of the present invention, the friction member of any of the previous aspects of the present invention further has a feature such that the composition containing the rubber and the resin has a viscosity of about 300000 CPS or more. In this aspect of the present invention, the high viscosity suppresses entry of the composition into the yarn of the friction member. Therefore, the friction member having a viscosity of about 10% or more can be produced without difficulty.

According to another aspect of the present invention, the friction member of any of the first three aspects of the present invention further has a feature such that the yarn for the friction member is formed by coating the base fibers with a clay-like composition containing rubber and resin supplied by an extruder. In this aspect of the present invention, the composition covers the outer peripheries of the base fibers. Thus, the rate of entry of the composition into the base fibers is very small. Consequently, the friction member having the porosity of about 10% or more can be easily obtained.

According to another aspect of the present invention, the friction member of any one of the aforementioned aspects of the present invention further has a feature such that the base fibers are made of only glass fibers.

According to another aspect of the present invention, the friction member of any one of the first five mentioned aspects of the present invention further has a feature such that the base fibers are made of a mixture of glass fibers and organic fibers. Alternatively, metal fibers can be included in the mixture.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENT

Figure 1:
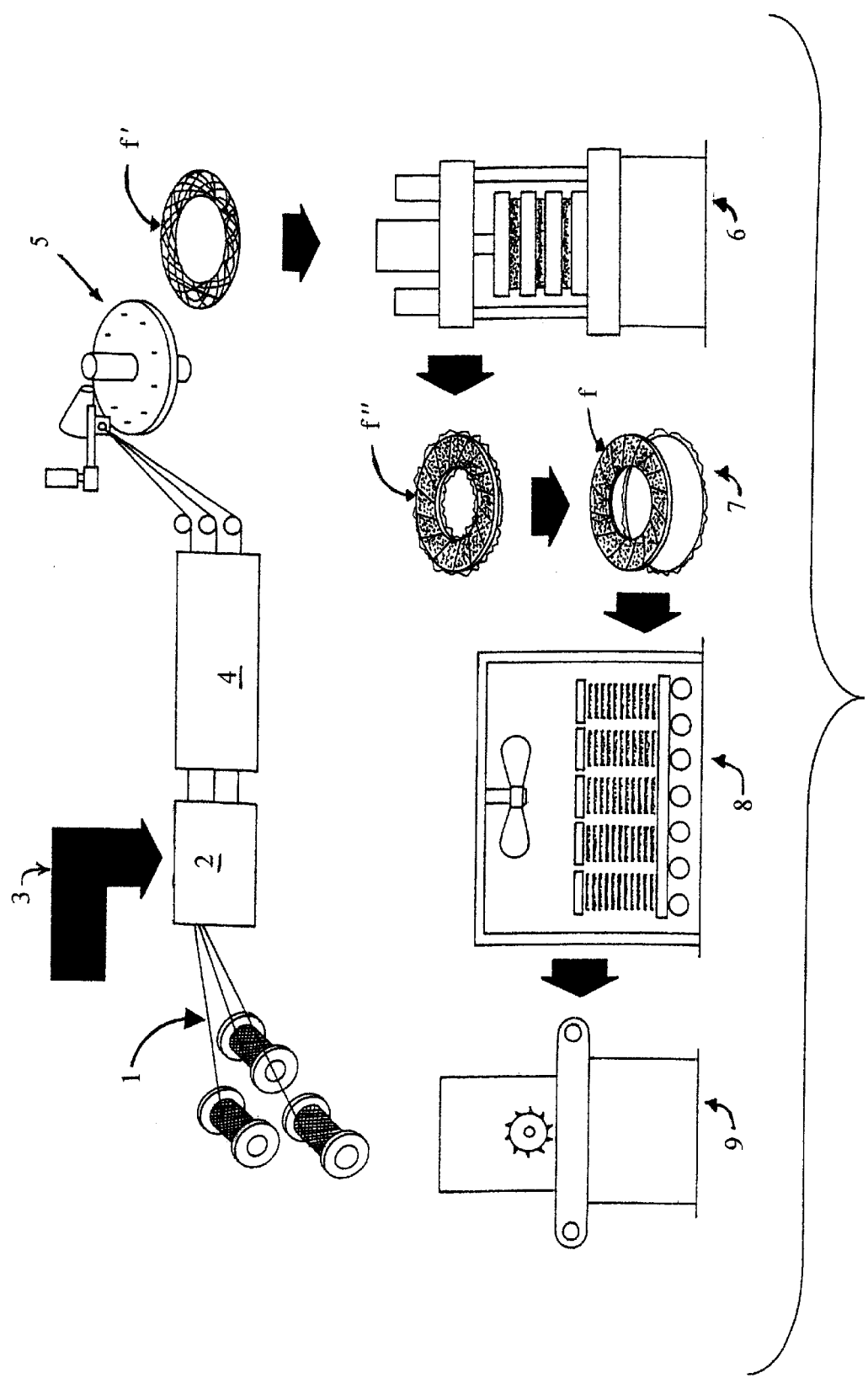
FIG. 1 is a schematic diagrammatical view showing a preferred process for manufacturing a friction member for a friction facing in accordance with an embodiment of the present invention.

As seen in FIG. 1, a preferred process for manufacturing a friction member for a friction facing is illustrated in accordance with an embodiment of the present invention. A manufacturing process includes an impregnation or coating step 2 for impregnating or coating glass yarn 1 with a composition 3 of rubber and/or resin. Another step is a drying step 4 for drying the impregnated or coated glass yarn 1. Other steps include a winding and shaping step 5, a thermal molding step 6, a trimming step 7, a curing (crosslinking and hardening) step 8 and a polishing step 9.

The glass yarn 1 is preferably formed of strands of: (1) only glass fibers; (2) strands of glass fibers and organic fibers; or (3) strands of glass fibers, organic fibers and metal fibers. The twist or twist rate of the strand save preferably equal to about 10–90 turns per meter (i.e., 10–90 T/M). If the twist were smaller than about 10 T/M, the strength of the strand would become excessively insufficient. Furthermore, it would be impossible to achieve the intended porosity. If it were larger than about 90 T/M, manufacturing problems would occur due to twist-back.

In the impregnation or coating step 2, the composition 3 contains rubber, thermosetting resin and/or other materials dissolved in a solvent. This composition 3 is used for the impregnating or coating the glass yarn 1. In the case of impregnation, a rubber and/or resin composition 3 having a viscosity of about 300000 CPS is used. By impregnating the yarn 1 with the composition 3 of such a high viscosity, it is possible to increase the porosity of the friction facing of the final product. If the viscosity were smaller than about 300000 CPS, the composition 3 would move into the yarn 1 without difficulty so that it would be impossible to achieve the intended porosity.

In the case of the coating, a clay-like rubber and/or resin composition 3 is used. The glass yarn 1 is moved through an extruder. The extruder supplies the clay-like rubber and/or resin composition 3 to the outer periphery of the glass yarn 1. Thereby, only the outer periphery of the glass yarn 1 is coated with the composition 3 while suppressing entry of the composition 3 into the glass yarn 1. The extruder used in this coating step 2 can be the same type, which is used for applying a coating to a lead line for electrical connections. The extruder for step 2 is a conventional piece of equipment that is well known in the art. Thus, the extruder for step 2 will not be discussed and/or illustrated herein.

The yarn 1 for the friction member is produced as described above. Then the yarn 1 is preshaped into an annular form during the winding and shaping step 5 by a conventional facing winding machine after the drying step 4. An initial friction member f' is produced. The initial friction member f' is heated and simultaneously subjected to press work in the thermal molding step 6, producing an intermediate member f''. Thereafter, the intermediate member f'' is subjected to a stress relief step (not shown). The intermediate member f'' is subjected to the trimming step 7 producing friction member f. Friction member f is completed by the curing (cross-linking and hardening) step 8, polishing step 9 and other steps.

EXPERIMENTAL EXAMPLES

Comparative examples and experimental examples are shown in the following table.

TABLE 1

| Comparative and Experimental Examples | | | | | |
|---|---|---|---|---|---|
| | C/E-1 | C/E-2 | E/E-1 | E/E-2 | E/E-3 |
| Mold Mixture | MX-1 | MX-1 | MX-1 | MX-1 | MX-2 |
| Twist (T/M) | 0 | 60 | 60 | 60 | 60 |
| Coating Manner | IMP 6000 cps | IMP 6000 cps | IMP 300000 cps | C/C | C/C |

TABLE 1-continued

| Comparative and Experimental Examples | | | | | |
|---|---|---|---|---|---|
| | C/E-1 | C/E-2 | E/E-1 | E/E-2 | E/E-3 |
| Porosity(%) | 5 | 5 | 10 | 10 | 15 |
| A/D (g/cm$^3$) | 1.60 | 1.67 | 1.62 | 1.62 | 1.70 |
| J/I (Nm) | 418 | 272 | 164 | 159 | 161 | where:
C/E: Comparative Example
E/E: Experimental Example
IMP: Impregnation (Dissolved in solvent at 6000 cps or 300000 cps)
C/C: Clay-like Covering
A/D: Apparent Density
J/I: Judder Index "MX-1" and "MX-2" are commercially available resins. "MX-1" and "MX-2" consist essentially of resin, but can contain other materials. The other materials do not affect the porosity of the final product. The above "MX-1" represents a mixture containing a relatively large amount of resin. "MX-2" represents a mixture containing a relatively large amount of rubber. The porosity represents a rate of spaces in the facing, and is expressed as a percentage of a volume of absorbed oil with respect to a volume of a specimen. This porosity is measured in the following manner under the following conditions.

As a general rule, the measurement is performed at a temperature of 23±2° C. and humidity of 50±5%. The density of the test oil is measured under JIS K 7112 (measuring method of density and specific gravity of plastics). The test is conducted according to the following steps:

(1) A mass of a specimen is measured with precision to 1 mg.
(2) The specimen is put in test oil, and is held for 8 hours at 90±10° C.
(3) The test oil is left for 12 hours or more until the oil reaches room temperature while keeping the specimen in the test oil.
(4) The specimen is taken out from the test oil, and the oil is removed from the surface of the specimen.
(5) A mass of the specimen is measured with precision to 1 mg.
(6) Porosity is determined using the formula: $P=(m2-m1)/\rho \times (1/V) \times 100$ (%)
where:
P: porosity
m1: mass of the specimen (g)
m2: mass of the specimen containing oil absorbed therein (g)
$\rho$: density of the test oil (g/cm$^3$)
V: volume of the specimen (cm$^3$)

The "apparent density" is obtained from the weight and the volume by calculation. The "judder" is a phenomenon in which abnormal vibrations occur in the clutch engaging operation, and is measured on a table tester having the same frequency as that of vibrations of an automobile. The "judder index" indicates a magnitude of a torque amplitude. The embodiment described above uses the composition 3 containing both the rubber and the resin. However, the composition 3 may contain only the rubber or only the resin. As can be seen from the foregoing experimental examples, the friction members which have a porosity of 10% or more and an apparent density of 1.75 or less can have good judder indexes and thus can effectively suppress judder. According to the invention, as described above, the invention can provide a friction member, which can suppress judder without impairing wear resistance.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only a selected embodiment has been chosen to illustrate the present invention, it will be apparent to those skilled in the art from this disclosure that various changes and modifications can be made herein without departing from the scope of the invention as defined in the appended claims. Furthermore, the foregoing description of the embodiment according to the present invention is provided for illustration only, and not for the purpose of limiting the invention as defined by the appended claims and their equivalents.

What is claimed is:

1. A friction member comprising:
   a yarn including a plurality of base fibers that are pre-shaped into a predetermined form and thermally molded; and
   a porosity increasing composition coupled to said base fibers of said yarn by impregnating said base fibers, said porosity increasing composition including a rubber material or a resin material with a high viscosity that results in said friction member having porosity in a range of about 10% to 20%.

2. The friction member according to claim 1, wherein an apparent density of said friction member is about 1.75 or less.

3. The friction member according to claim 1, wherein said yarn for said friction member comprises strands of said base fibers having a twist of about 10–90 T/M.

4. The friction member according to claim 1, wherein said composition has a viscosity of about 300000 CPS or more.

5. The friction member according to claim 1, wherein said base fibers consist of glass fibers.

6. The friction member according to claim 1, wherein said base fibers comprise a mixture comprising glass fibers and organic fibers.

7. The friction member according to claim 6, wherein said base fibers further comprise metal fibers.

8. The friction member according to claim 2, wherein said yarn for said friction member comprises strands of said base fibers having a twist of about 10–90 T/M.

9. The friction member according to claim 8, wherein said composition has a viscosity of about 300000 CPS or more.

10. The friction member according to claim 9, wherein said base fibers consist of glass fibers.

11. The friction member according to claim 9, wherein said base fibers comprise a mixture comprising glass fibers and organic fibers.

12. The friction member according to claim 11, wherein said mixture further comprises metal fibers.

13. The friction member according to claim 1, wherein said porosity increasing composition consists essentially of a rubber material.

14. The friction member according to claim 1, wherein said porosity increasing composition consists essentially of a resin material.

15. The friction member according to claim 1, wherein said porosity increasing composition comprises a combination of rubber and resin materials.

16. The friction member according to claim 1, wherein said base fibers are impregnated with said porosity increasing composition.

17. The friction member according to claim 1, wherein said base fibers are coated with said porosity increasing composition.

18. The friction member according to claim 1, wherein said predetermined form is an annular form.

19. A friction member comprising:
    a yarn including a plurality of base fibers that are pre-shaped into a predetermined form and thermally molded; and
    a porosity increasing composition coupled to said base fibers of said yarn by coating said base fibers, said porosity increasing composition including a rubber material or a resin material that results in said friction member having porosity in a range of about 10% to 20%.

20. The friction member according to claim 19, wherein an apparent density of said friction member is about 1.75 or less.

21. The friction member according to claim 19, wherein said yarn for said friction member comprises strands of said base fibers having a twist of about 10–90 T/M.

22. The friction member according to claim 19, wherein said yarn for the friction member is formed by coating said base fibers with a clay-like composition containing said rubber and said resin and is supplied by an extruder.

23. The friction member according to claim 19, wherein said base fibers consist of glass fibers.

24. The friction member according to claim 19, wherein said base fibers comprise a mixture comprising glass fibers and organic fibers.

25. The friction member according to claim 24, wherein said base fibers further comprise metal fibers.

26. The friction member according to claim 20, wherein said yarn for said friction member comprises strands of said base fibers having a twist of about 10–90 T/M.

27. The friction member according to claim 21, wherein said yarn for the friction member is formed by coating said base fibers with a clay-like composition containing said rubber and said resin and is supplied by an extruder.

28. The friction member according to claim 19, wherein said porosity increasing composition consists essentially of a rubber material.

29. The friction member according to claim 19, wherein said porosity increasing composition consists essentially of a resin material.

30. The friction member according to claim 19, wherein said porosity increasing composition comprises a combination of rubber and resin materials.

31. The friction member according to claim 19, wherein said base fibers are impregnated with said porosity increasing composition.

32. The friction member according to claim 19, wherein said base fibers are coated with said porosity increasing composition.

33. The friction member according to claim 19, wherein said predetermined form is an annular form.

* * * * *